INVENTOR.
Jack Miller

Aug. 6, 1963

J. MILLER 3,100,255

METHOD FOR AIR CARBON-ARC CUTTING OR GOUGING

Filed Oct. 9, 1961

INVENTOR.
Jack Miller
BY
*Roland A. Anderson*
ATTORNEY

3,100,255
METHOD FOR AIR CARBON-ARC CUTTING OR GOUGING

Jack Miller, Clinton, Tenn., assignor to the United States of America as represented by the United States Atomic Energy Commission
Filed Oct. 9, 1961, Ser. No. 143,985
3 Claims. (Cl. 219—70)

This invention relates to a method and apparatus for air carbon-arc cutting or gouging which is substantially free of the air-borne dust, fumes, gases, etc., associated with electric carbon-arc cutting.

Generally the process of carbon-arc cutting comprises the application of the heat energy of an electric arc to melt a metal along a desired line or direction, that is, an electrical arc is drawn between a carbon or graphite electrode and the metal to be cut or gouged. Suitable means may be provided to direct a gas-jet blast continuously against the molten metal, thus facilitating its removal. This carbon-arc cutting may be used, for example, for the removal or gouging out of weld metal joining separable sections of metallic members.

In the above process, respiratory protection equipment and a special ventilation system are required to facilitate the removal of hazardous gases, fumes and air-borne carbon dust which are associated with this process of carbon-arc cutting. Use of this equipment reduces the health hazards, but the settled dust problem still remains to some degree. The required use of respiratory protection equipment, in addition to the normal welding face shield and flash goggles, greatly reduces the efficiency of the operator of the cutting process.

With a knowledge of the above health hazard problems and the lowered efficiency of the operator in the carbon-arc cutting process, it is a primary object of this invention to provide an improved carbon-arc cutting process and apparatus wherein during the cutting operation there is essentially a complete absence of fumes, gases, and air-borne carbon dust.

It is another object of this invention to provide an improved carbon-arc cutting process and apparatus including means for essentially eliminating fumes, gases, and air-borne carbon dust during the cutting operation.

It is still another object of this invention to provide an improved carbon-arc cutting apparatus wherein the operator is not required to wear respiratory protection equipment, thereby increasing his efficiency during a cutting operation.

These and other objects and advantages of this invention will become apparent from a consideration of the following detailed description and the accompanying drawings, wherein.

The above objects have been accomplished in the present invention by providing a jet of water which is directed upon the carbon electrode at some point near the arcing tip of the electrode. This point is preferably about ¼ to ½ inch from the electrode tip. The flow of water is adjusted such that there is essentially complete vaporization of the water which extends to the electrode tip. It has been determined that provision of this complete water vaporization at the arcing tip of the electrode essentially eliminates the dusts, fumes, and gases resulting from the consumable burning of the carbon electrode.

Figure 1:
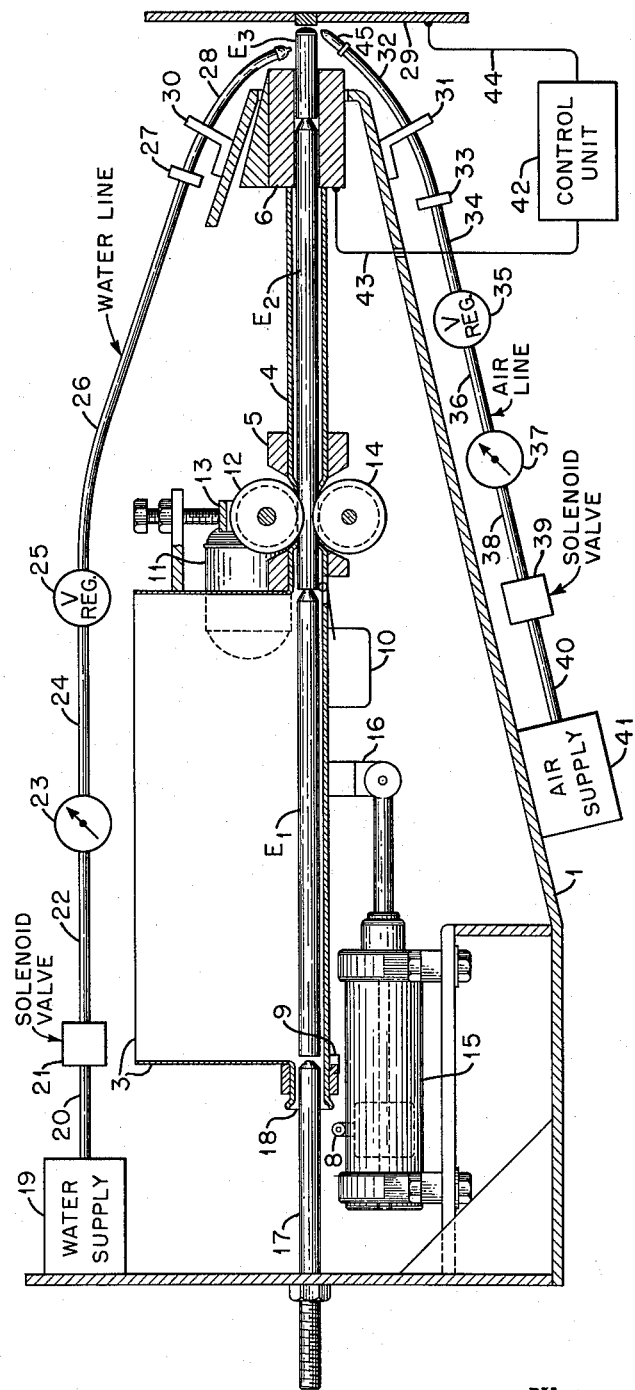
FIG. 1 is a cross-sectional view of an automatic air carbon-arc cutting device with the carbon electrode in an operating position and in which the principles of this invention may be carried out.
Figure 3:
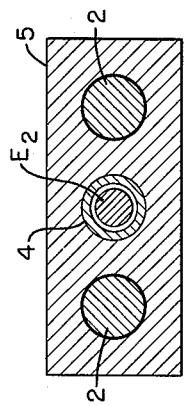
FIG. 3 is a sectional view on the line 3—3 of FIG. 1 showing the support rods for the electrode assembly.

FIG. 1 illustrates one embodiment in which the principles of this invention may be carried out, and includes means for automatically and continuously feeding a carbon electrode in an air carbon-arc cutting operation. A vertically disposed electrode magazine 3 is provided within which a plurality of vertically stacked carbon electrodes are placed, only one of which is shown. Magazine 3 is provided with a feed tube 4 projecting therefrom. Magazine 3 and feed tube 4 are slidably supported and maintained in parallel relationship between two support rods 2 as shown in FIG. 3 by means of rigid attachment to a plurality of slidable cross supports 5, only one of which is shown. The cross supports 5 are perpendicularly disposed between the support rods 2 and are slidably engaged thereto.

The feed tube 4 is rigidly attached at one end to the magazine 3 and through rigid attachment to the cross supports 5 maintains a parallel relationship to and between the support rods 2. The opposite end of the feed tube 4 is provided with electrical contact means 6 for an electrode, the operation of which will be described hereinafter. A cross support, not shown, is also rigidly attached to the contact means 6 for slidable engagement with the support rods 2. The support rods 2 are affixed to a frame 1 by means, not shown. The magazine feed tube assembly is slidably maintained upon the support rods 2 mounted on frame 1 and is positionable as an assembly thereupon by means to be described hereinbelow.

An air cylinder 15 is mounted on the frame 1 and serves as a means for the rapid positioning of the magazine-feed tube assembly along the support rods 2 by means of a mechanical linkage 16, in a manner to be described below.

As shown in FIG. 1, the magazine feed tube assembly is positioned towards the cutting end of the frame 1 with an electrode $E_3$ shown projecting from the contact means 6 in close proximity to a workpiece 29 as would be the case during a cutting operation. A sensing element 8 is rigidly attached to the frame 1 and located for operative engagement with an arm 9 located in rigid attachment to the magazine 3. The purpose and operation of the sensing element 8 and the arm 9 will be explained below. An electrode sensing element 10 is rigidly attached beneath the magazine 3 and its function will be described below.

A rheostat controlled variable-speed electric motor 11 is rigidly mounted to the magazine 3 and is operatively connected through a ratchet-clutch arrangement to a drive wheel 12. The axis of the drive wheel 12 is normal to the feed tube 4, and the drive wheel 12 is adjustably mounted thereover by means of a yieldable and adjustable yoke 13 mounted upon the magazine 3. The drive wheel 12 projects at its lowermost portion within a slot provided in the feed tube 4. The extent of projection of wheel 12 within the feed tube 4 is adjustably maintained by means of the yoke 13 to bring the wheel 12 to bear upon any electrode positioned thereunder. An idler wheel 14 is mounted under the feed tube 4, opposite the drive wheel 12 and similarly bears upon the electrode from the underside. The portions of the drive wheel 12 and idler wheel 14 which are in contact with the electrode are constructed of rubber or the like.

As shown in FIG. 1, the air cylinder 15 positions the magazine 3 and feed tube assembly towards the cutting end of the frame 1. This positions the tip of the electrode projecting through the electrical conductor blocks 6 the desired distance from the workpiece 29. An electrode $E_1$ is shown within the magazine 3 and a second electrode $E_2$ is shown within the feed tube 4 and is between and in contact with the rotating drive wheel 12 and idler wheel 14. Directly in front and being urged forward by the electrode $E_2$ is an electrode $E_3$. The electrode $E_3$ is advanced between and through a pair of yieldable electrical conductor blocks 6. The blocks 6 are generally in intimate contact with the electrode $E_3$ projecting therethrough and provide means continuously conducting a high amperage current to the electrode. The blocks are water cooled by means, not shown, and are insulated from the other components of the device. A control unit 42 includes a constant potential motor generator power source for supplying a voltage of about 50 volts and a current up to 1200 amperes to the arc electrode during a cutting operation, and includes a master switch for controlling the power source. The control unit 42 is connected to one of the blocks 6 and to the workpiece by leads 43 and 44, respectively. Arcing occurs upon electrode contact with the workpiece 29, and the cutting or gouging operation begins immediately. The cutting is accomplished by slowly moving the workpiece with respect to the electrode by means not shown.

An air-jet blast is continuously directed against the molten metal during a cutting operation, thus facilitating its removal. Air for this purpose is supplied from an air supply 41, through tubing 40, solenoid valve 39, tubing 38, pressure indicator gauge 37, tubing 36, a regulator valve 35, tubing 34, coupling 33, tubing 32, and a nozzle 45. The nozzle 45 directs an air-jet blast against the molten metal during a cutting operation. The tubing 32 is held in place by a bracket 31 affixed to the frame member 1. Proper air-jet pressure setting is important to obtain a smooth symmetrically contoured groove during the cutting operation.

The controllable speed of rotation of the drive wheel 12 establishes the rate of electrode feed. The rate of electrode feed is determined by the rate the electrode is being consumed during a cutting operation. The electrode $E_3$ or a subsequent electrode is therefore maintained at a desired projection length from the blocks 6.

The air-jet feed components are normally mounted 180° from their position shown in FIG. 1, but are shown on the bottom of the frame member 1 for the sake of clarity. Thus, the major part of the molten metal removed by the air blast is directed downward rather than upward during a cutting operation. A shield forms the front end of the machine head frame member to impede hot metal blow-back and protects the machine and operator.

In order to essentially eliminate air-borne carbon dust, fumes, and gases which are generated by the act of consumably burning the carbon electrode during a cutting operation, a jet of water is directed upon the carbon electrode at some point between the arcing tip of the electrode and where the electrode is held by the water cooled conductor blocks 6. The preferable point of impingement is about ¼ to ½ inch from the electrode tip, and at an angle of about 45°. Water for this purpose is supplied from a water supply 19 through tubing 20, a solenoid valve 21, tubing 22, a vaned flow indicator 23, tubing 24, a regulator valve 25, tubing 26, coupling 27, and through a tubing 28. Tubing 28 is provided with a nozzle for directing a jet spray of water upon the electrode. Tubing 28 is held in place by means of a bracket 30 affixed to the frame member 1. The water must impinge upon the electrode such as to cause the water to vaporize at the arcing tip of the electrode. The flow of water is adjusted such that there is essentially complete vaporization of the water. It has been determined that this complete vaporization of the water which extends to the electrode tip will substantially completely eliminate the carbon dust, gases and fumes associated with arc cutting operation. It has also been determined that the following variations are ineffective in eliminating the air-borne dusts, fumes, etc.: (1) directing the water into the arc itself without the water first flowing over the electrode, (2) directing the water onto the workpiece at the point where the arc is formed, and (3) directing the water onto the workpiece at a point adjacent the point of arcing. The aforelisted inoperable conditions are due to the fact that the majority of the dusts, fumes and gases are generated by the act of consumable burning of the carbon electrode. Thus, it can be seen that by providing the end of the electrode and the arcing tip thereof width vaporized water, the objectionable dust, gases and fumes are essentially completely eliminated such that the operator would not be required to wear respiratory protection equipment during the cutting operation and would be able to increase his speed of cutting.

Figure 2:
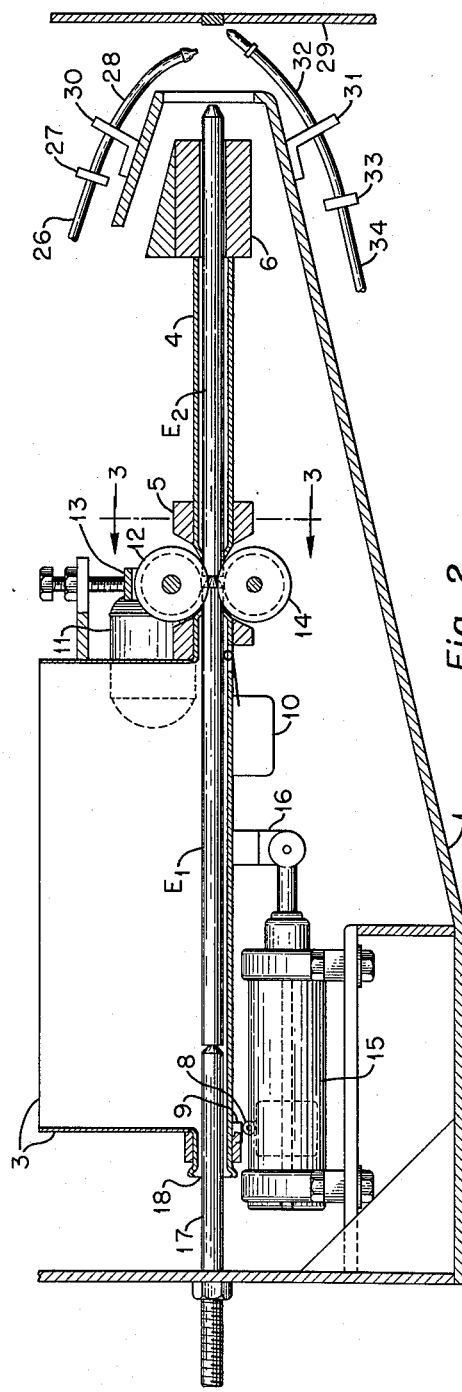
FIG. 2 is another cross-sectional view of the device of FIG. 1 with the carbon electrode in a withdrawn position from the workpiece.

In FIG. 1, it should be noted that the flexible member of the sensing element 10, which is partially inserted through an opening in the feed tube 4 wall, is depressed by the electrode $E_2$. As the electrode advances beyond the end of this flexible member, the switch of the sensing element 10 is actuated and through conventional instrumentation, not shown, actuates the air cylinder 15 to retract the magazine-feed tube assembly as shown in FIG. 2. As seen in FIG. 2, the air cylinder 15 draws the magazine-feed tube assembly back from the cutting end. An ejection rod 17, which is adjustably fastened to the frame 1, is inserted within an opening 18, located in the magazine 3, and forces the electrode $E_1$ between the drive wheel 12 and idler wheel 14. This action also forces the electrode $E_2$ through the electrical conductor blocks 6 and projects it in the same distance therefrom that the expelled electrode $E_3$ was maintained.

When the magazine-feed tube assembly has completed its movement back from normal cutting postiion to effect the above-described electrode ejection and replacement, the arm member 9, which is rigidly fastened to the magazine 3, causes the switch of the sensing element 8 to close and this closed switch, through conventional instrumentation, not shown, causes the air cylinder 15 to reverse its stroke and return the magazine-feed tube assembly to the position as shown in FIG. 1. The drive wheel 12 continues to advance the electrode underneath, which is now electrode $E_1$, and thus also advances the electrode $E_2$ through the conductor block. When the electrode $E_1$ reaches the position of electrode $E_2$ in FIG. 1, a new electrode will fall into position at the bottom of the magazine 3, and the cycle will be repeated. In the above operation, the spent electrode is ejected and the replacement electrode loaded and ready for contact with the work in about a second.

The master switch of the control unit 42, referred to above, energizes the electrode drive motor 11, the water line solenoid valve 39, and controls the means for feeding cooling water to the conductor blocks 6, in addition to energizing the power source for operation of the carbon arc.

The abve-described device with the water vaporization feature has greatly reduced the settled dust problem and essentially eliminated the health hazards of the carbon arc cutting operation. In addition to the advantageous elimination of health hazards, the operation of the above-described device will permit an increase in the speed of cutting or gouging by about 20 percent over that obtained by prior automatic carbon-arc cutting devices, and will produce a smooth, clean groove or cavity which greatly facilitates any subsequent rewelding of the separated sections.

This invention has been described by way of illustration rather than limitation and it should be apparent that this invention is equally applicable in fields other than those described.

What is claimed is:

1. A device for the air carbon-arc cutting of a movable metallic workpiece comprising a consumable carbon electrode, means for establishing and maintaining a carbon arc discharge between said electrode and said workpiece during a cutting operation, said discharge forming a molten metal puddle at the point on said workpiece where said discharge is formed, means for continuously moving said electrode toward said workpiece at a controlled speed as a function of the rate said electrode is consumed during said cutting operation, a source of air, a first nozzle, means for feeding air from said air source through said nozzle at a first controlled rate, said nozzle being directed toward said molten metal puddle to facilitate removal thereof, a source of water, a second nozzle, means for feeding water from said water source through said second nozzle in the form of a jet spray and at a second controlled rate onto said electrode at a point close to the tip of said electrode such that said jet spray of water is completely vaporized by said electrode, said vaporized water extending to said tip of said electrode, said vaporized water serving as a means for substantially completely eliminating the carbon dust, gases and fumes formed by said consumable electrode during said cutting operation.

2. The device set forth in claim 1 and further including means for automatically ejecting said electrode when it is nearly expended and inserting another electrode in its place.

3. An improved method for air carbon-arc cutting of a movable metallic workpiece comprising the steps of establishing and maintaining a carbon-arc discharge between a consumable carbon electrode and said workpiece during a cutting operation, moving said electrode toward said workpiece at a selected speed as a function of the rate said electrode is consumed during said cutting operation, directing a jet stream of air at the molten metal puddle formed by said discharge during said operation to facilitate removal of said molten metal, and simultaneously directing a jet stream of water at a controlled rate onto said electrode at a point close to the tip thereof such that said jet spray of water is completely vaporized by said electrode, said vaporized water extending to said tip of said electrode and serving as a method of substantially completely eliminating the carbon dust, gases and fumes formed by said consumable electrode during said cutting operation.

References Cited in the file of this patent

UNITED STATES PATENTS

| | | |
|---|---|---|
| 1,324,337 | Chapman et al. | Dec. 9, 1919 |
| 1,866,044 | Krebs | July 5, 1932 |
| 1,958,649 | Stine | May 15, 1934 |
| 2,028,780 | Ito | Jan. 28, 1936 |
| 2,032,240 | Westhaver | Feb. 25, 1936 |